United States Patent [19]

Theriault

[11] 4,366,498

[45] Dec. 28, 1982

[54] I.F. RESPONSE CONTROL SYSTEM FOR A TELEVISION RECEIVER

[75] Inventor: Gerald E. Theriault, Hopewell, N.J.

[73] Assignee: RCA Corporation, New York, N.Y.

[21] Appl. No.: 258,928

[22] Filed: Apr. 30, 1981

[51] Int. Cl.$^3$ .......................................... H04N 9/535
[52] U.S. Cl. .................................. 358/38; 358/21 V
[58] Field of Search ............................... 358/21 V, 38

[56] References Cited

U.S. PATENT DOCUMENTS

| 2,895,004 | 7/1959 | Fredendall | 358/38 |
| 2,921,120 | 1/1960 | Pritchard et al. | 178/5.4 |
| 2,934,599 | 4/1960 | Holmes | 178/5.4 |
| 3,679,816 | 7/1972 | Avins et al. | 178/5.4 HE |
| 4,096,515 | 6/1978 | Brown, Jr. et al. | 358/28 |
| 4,130,831 | 12/1978 | Isono et al. | 358/27 |
| 4,152,721 | 5/1979 | Kim | 358/21 V |

Primary Examiner—Richard Murray

Attorney, Agent, or Firm—Eugene M. Whitacre; Paul J. Rasmussen; Peter M. Emanuel

[57] ABSTRACT

A system is provided for controlling the intermediate frequency passband response of a television receiver in response to a vertical interval reference (VIR) signal. The baseband VIR signal includes a chrominance reference bar signal component and a luminance reference level signal component. The amplitudes of these two signal components are detected and differentially compared to develop a control signal indicative of the ratio of the two detected signal components. A passband shaping circuit included within the intermediate frequency signal processing section of the television receiver is responsive to the control signal for dynamically adjusting the amplitude versus frequency response characteristic of the intermediate frequency signal processing section as a function of the ratio indication control signal.

8 Claims, 7 Drawing Figures

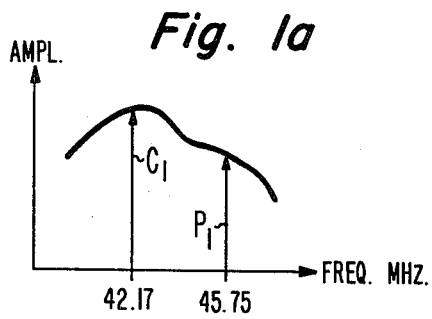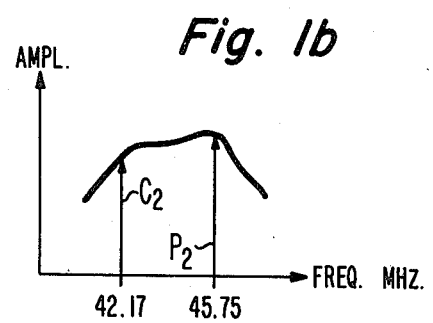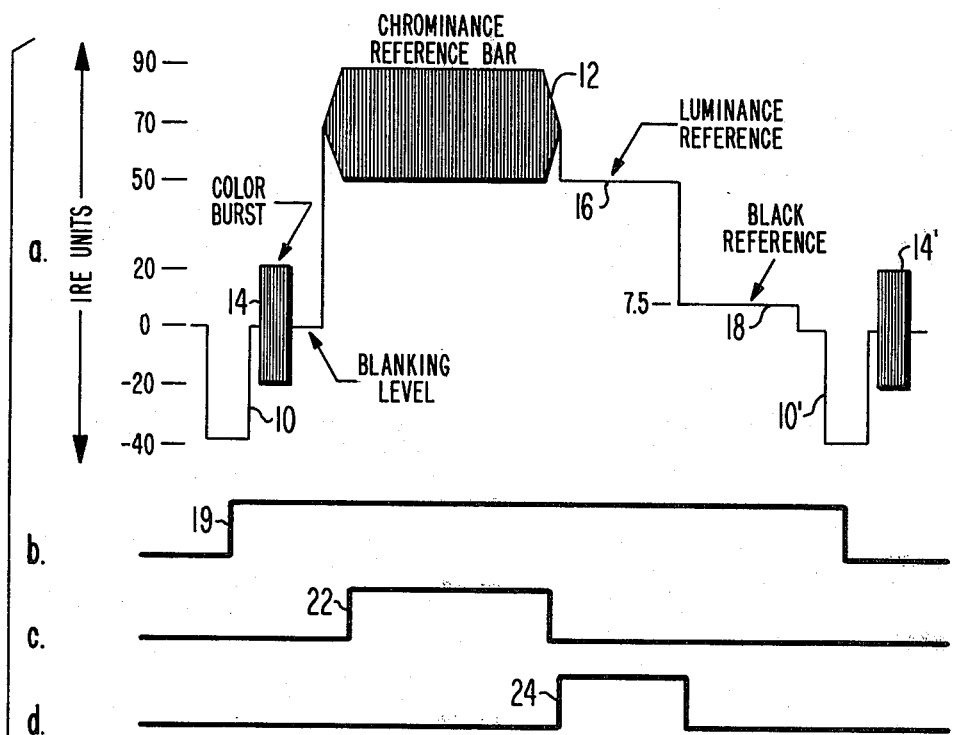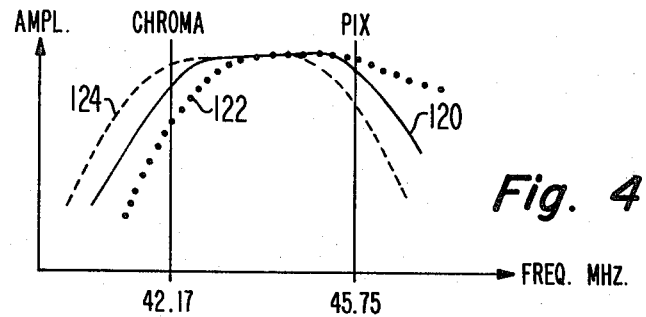

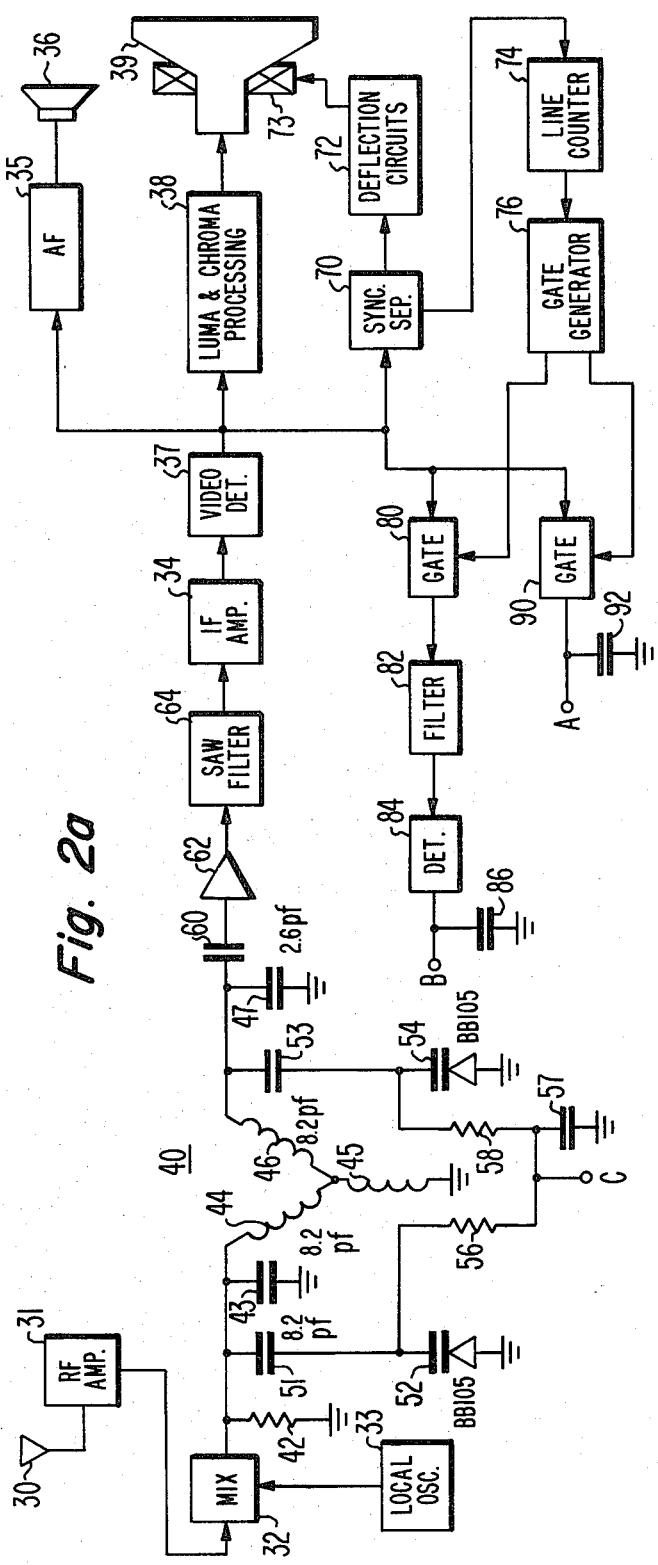
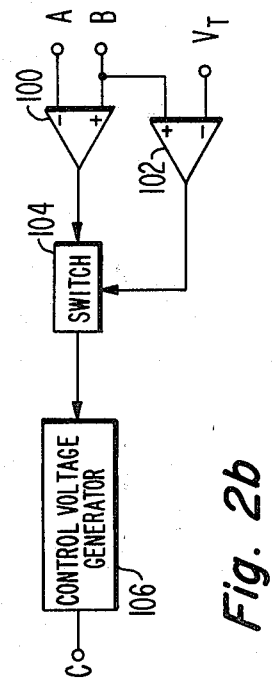
Fig. 2a
Fig. 2b
Fig. 2c

I.F. RESPONSE CONTROL SYSTEM FOR A TELEVISION RECEIVER

This invention relates to systems for controlling the intermediate frequency (I.F.) response characteristics of a television receiver and, in particular, to a system which controls the I.F. passband response characteristic of a television receiver in response to parameters of a vertical interval reference (VIR) signal.

In a typical television receiver designed to receiver NTSC system television signals, the received radio frequency signals are converted to standard I.F. frequencies. Specifically, the picture carrier of the desired television channel is converted to a frequency of 45.75 MHz, and the suppressed chroma subcarrier signal is converted to a frequency of 42.17 MHz. The desired channel signals are applied to passband shaping circuitry, which sharply attenuates adjacent channel signals and attenuates the picture carrier and chroma subcarrier signals slightly relative to the signal level at the center of the passband. The I.F. signals are then processed and demodulated to baseband frequencies for display of the video information on the kinescope and reproduction of the audio information.

After passband shaping, it is desirable for the picture and the chroma I.F. carrier signals to exhibit a substantially constant relationship for accurate reproduction of the luminance and chrominance information. However, the relative amplitudes of these two signals can be adversely affected by the response characteristics of the antenna and the tuner circuitry. The antenna and tuner circuits can exhibit nonlinear amplitude response characteristics, causing signals of certain frequencies to be attenuated by greater or lesser degrees than signals of other frequencies. As a result, the picture and chroma I.F. carrier signals at the output of the tuner can exhibit an undesired amplitude relationship, thereby producing luminance level and color saturation imbalance in the reproduced video image.

In accordance with the principles of the present invention, a system is provided for controlling the relative amplitudes of the chroma and picture carrier I.F. signals and their sidebands through control of the amplitude versus frequency characteristic of the I.F. passband. The system utilizes a VIR signal, when present, as a source of control information. The baseband VIR signal is gated to a first detector which detects the amplitude of the chrominance reference bar of the VIR signal, and to a second detector which samples the luminance reference level of the VIR signal. These two information components are applied to a comparator, which produces an output signal indicative of the amplitude ratio of the two signal components. The amplitude ratio signal is applied to a network which provides passband shaping of the I.F. signals to establish the I.F. passband response for the chroma and picture I.F. carrier signals.

In a first embodiment of the present invention, the passband shaping network comprises a dynamically controlled double-tuned circuit. The amplitude ratio signal controls the circuit tuning such that the chroma and picture I.F. carrier signal levels may be simultaneously altered in opposite senses; that is, the amplitude of one I.F. carrier signal is increased, while the amplitude of the other is decreased, and vice versa.

In a further embodiment of the invention, a microprocessor is used to develop the amplitude ratio signal. The detected VIR signal components are converted to digital signals and applied to the microprocessor. The microprocessor determines whether the VIR signal components are within an expected range of values, which provides VIR signal identification and noise immunity. The microprocessor then calculates the appropriate amplitude ratio signal for the passband shaping network.

In the drawings:

FIGS. 1a and 1b illustrate I.F. passbands in which the chroma and picture carrier signals exhibit unequal amplitudes;

FIGS. 2a, 2b and 2c illustrate, partially in block diagram form and partially in schematic diagram form, a television receiver including I.F. passband control systems constructed in accordance with the principles of the present invention;

FIG. 3 illustrates waveforms explaining the operation of the I.F. passband control system of FIG. 2a; and FIG. 4 illustrates the I.F. passband shaping provided by the systems of FIGS. 2a, 2b and 2c.

Referring to FIGS. 1a and 1b, I.F. passband responses are shown in which the chroma and picture carrier exhibit unequal amplitude responses. These response curves are typical of those resulting from undesirable response characteristics of a television antenna and/or tuner. In FIG. 1a, the tuner output signals have been distorted so that the chroma carrier signal $C_1$ exhibits a greater response than the picture carrier $P_1$. Signals processed by an I.F. passband having this characteristic will produce a television image with too much color saturation relative to the luminance levels. Similarly, FIG. 1b shows an I.F. passband in which the picture carrier level response $P_2$ exceeds the response of the chroma carrier $C_2$. A television signal processed by this passband will produce washed out colors due to insufficient color saturation relative to the luminance levels.

The undesirable passband characteristics of FIGS. 1a and 1b are cured by use of the television receiver systems of FIGS. 2a, 2b and 2c. The receiver system of FIGS. 2a is used in cooperation with the control signal generating arrangements of FIG. 2b or FIG. 2c.

In FIG. 2a, radio frequency (RF) television signals received by an antenna 30 are applied to the input of an RF amplifier 31. The output of the RF amplifier 31 is coupled to the input of a mixer 32. In the mixer, the RF signals are beat with signals from a local oscillator 33 to convert the signals to I.F. frequency signals. The output of the mixer 32 is coupled to one end of a load resistor 42, the other end of which is coupled to ground.

The output of the mixer 32 is also coupled to one end of series-connected inductors 44 and 46. A third inductor 45 is coupled between the junction of inductors 44 and 46, and ground. A capacitor 43 is coupled in parallel with inductors 44 and 45, and a capacitor 47 is coupled in parallel with inductors 45 and 46. A capacitor 51 and a varactor diode 52 are coupled in series between the junction of capacitor 43 and inductor 44, and ground. A capacitor 53 and a varactor diode 54 are coupled in series between the junction of inductor 46 and capacitor 47, and ground. Elements 43–54 are parts of a double-tuned circuit 40. A terminal C is coupled to the junction of capacitor 51 and varactor diode 52 by way of a resistor 56, and to the junction of capacitor 53 and varacter diode 54 by a resistor 58. A capacitor 57 is coupled between the junction of resistors 56 and 58 and ground.

The junction of inductor 46 and capacitors 47 and 53 is coupled by a capacitor 60 to the input of a preamplifier 62. The output of the preamplifier is coupled to the input of a surface acoustic wave (SAW) filter 64. The output of the SAW filter is coupled to the input of an I.F. amplifying stage 34. The output of the I.F. amplifying stage is coupled to the input of a video detector 37, which produces sound I.F. signals and baseband video signals at its output. The sound I.F. signals are applied to an audio frequency signal processing stage 35 for the reproduction of audio information by a loudspeaker 36. The baseband video signals are applied to luminance and chrominance processing circuitry 38, which supplies demodulated color signals to a kinescope 39 for reproduction of a video image. The video signals are also applied to the input of a synchronization signal separating circuit 70, which supplies separated sync signals to deflection circuits 72. The output of the deflection circuits is coupled to a yoke 73 to provide kinescope beam deflection.

The sync separator 70 applies horizontal sync signals to the input of a line counter 74. The output of the line counter is coupled to the input of a gate signal generator 76. The gate signal generator 76 has outputs coupled to control inputs of gates 80 and 90. The signal inputs of gates 80 and 90 are coupled to the output of the video detector 37. The signal output of gate 90 is coupled to an output terminal A. A capacitor 92 is coupled between terminal A and ground. The signal output of gate 80 is coupled to the input of a filter 82. The output of filter 82 is coupled to the input of a detector 84. The output of detector 84 is coupled to an output terminal B. A capacitor 86 is coupled between output terminal B and ground.

The signals developed at terminals A and B are used to develop a control voltage for the terminal C of the double-tuned circuit 40. An arrangement for developing the control voltage is shown in FIG. 2b. Terminals A and B are coupled to inputs of a differential ampliflier 100, the output of which is coupled to the signal input of a switch 104. Terminal B is also coupled to one input of a comparator 102. A reference threshold voltage $V_T$ is applied to the other input of the comparator. The output of comparator 102 is coupled to the control input of the switch 104. The output of the switch 104 is coupled to the input of a control voltage generator 106, the output of which is coupled to terminal C of the double-tuned circuit 40.

During operation of the combined arrangements of FIGS. 2a and 2b, a VIR signal is detected, when present in the video signal, by video detector 37. The VIR signal is contained in line 19 of the video signal, which is a part of the vertical retrace interval. A typical VIR signal is shown in FIG. 3a, and contains a horizontal sync pulse 10 and a color burst signal 14 in their conventional line locations. The color burst signal 14 is followed by a chrominance reference bar 12 of the same frequency as the color burst signal. The color reference bar 12 has an amplitude normally varying between 50 and 90 IRE units. The chrominance reference bar is followed by a luminance reference level 16 and a black reference level 18 before the line ends at the horizontal sync pulse 10' of line 20. The VIR signal at the output of the video detector 37 is applied to the signal input of gates 80 and 90. Sync pulses from the sync separator 70 are counted by the line counter 74 to determine the occurrence of line 19. At that time, the line counter applies a line 19 gating pulse, shown in FIG. 3b as waveform 19, to the gate generator 76. Timing circuits within the gate generator 76 respond to the line 19 gating pulse by producing a chrominance reference bar gating pulse 22 for gate 80 during the occurrence of the chrominance reference bar 12, as shown in FIG. 3c. The gate generator also applies a luminance reference level gating pulse 24 to the control input of gate 90, as shown in FIG. 3d.

Gating pulse 22 closes gate 80 during the chrominance reference bar interval, during which time the chrominance reference bar is filtered and amplitude detected by filter 82 and detector 84. A signal representative of the peak amplitude of the chrominance reference bar is developed at the output of the detector 84, is stored by capacitor 86 and made available at terminal B.

Gating pulse 24 closes gate 90 during the interval that the luminance reference level is produced. The luminance reference level is sampled and stored by capacitor 92, and made available at terminal A.

The double-tuned circuit 40 includes two major tuned sections. On the input side, inductors 44 and 45 are tuned in cooperation with capacitor 43 and capacitor 51 in series with varactor diode 52. The varactor diode 52 may be tuned over a range of capacitance values by the control voltage at terminal C. The capacitance of the varactor diode is applied to the input side of the double-tuned circuit by capacitor 51. This capacitor provides D.C. isolation of the tuning voltage from the rest of the tuned circuit and provides a division of the reactive voltage across capacitor 51 and the varactor diode 52. The magnitude of the required control voltage range is determined by the value of capacitor 51. When the capacitor 51 is made large, only a small control voltage change is required to vary varactor diode 52 over its full capacitive range. When the capacitor 51 is made small, a larger control voltage range is needed to control the varactor diode 52 over its full range.

The output side of the double-tuned circuit 40 is likewise tuned by inductors 45 and 46 in parallel with capacitor 47 and the series combination of capacitor 53 and varactor diode 54. The control voltage range required to vary the capacitance value of varactor diode 54 over its full range is similarly determined by the magnitude of capacitor 53.

When the television signal includes no VIR signal, the control voltage generator 106 applied a nominal midrange voltage to terminal C to tune the double-tuned circuit. This midrange voltage will tune the circuit so that the amplitudes of the picture and chrominance I.F. carrier signals are affected substantially equally by the double-tuned circuit 40. The response characteristic of the double-tuned circuit will appear substantially as shown by curve 120 in FIG. 4 under these conditions. The chroma and picture (PIX) carriers are seen to exhibit substantially equal amplitudes below the response curve 120.

The VIR signal waveform illustrated in FIG. 3a represents a nominal VIR signal. The chrominance and luminance signal components will be detected at terminals A and B, and applied to the inputs of differential amplifier 100, which produces an output signal indicative of the ratio of the levels of the detected signal components. The detected chrominance component is also applied to comparator 102, which will verify the presence of a VIR signal by producing an output signal when the detected chrominance component exceeds the threshold level $V_T$. This output signal will close switch 104 and apply the ratio indication signal to the control voltage generator 106. For the VIR signal of FIG. 3a, the control voltage generator will apply a nominal control voltage to terminal C, which will produce a characteristic response for the double-tuned circuit 40 as shown by curve 120 of FIG. 4. Under these conditions, no modification of the normal I.F. passband response is required.

When the antenna and/or tuner distort the I.F. signal carrier amplitude relationship, as shown in FIG. 1a, the VIR signal levels will be affected in the following way. The high chroma carrier level illustrated in FIG. 1a will result in the production of a chrominance reference bar with a substantial peak amplitude. The lower frequency luminance signal components, including the luminance and black reference levels and the sync pulse levels, will be compressed as a result of the lower amplitude I.F. picture signal carrier and its surrounding lower baseband frequency components. These two factors will result in a higher than normal ratio of the signal level at terminal B to the signal level at terminal A. The high ratio indication signal at the output of the differential amplifier 100 will cause the control voltage generator 106 to produce a higher control voltage. The higher control voltage will increase the resonant frequencies of the double-tuned circuit 40, which will exhibit a response as shown by dotted curve 122 in FIG. 4. As FIG. 4 illustrates, the chroma carrier amplitude will be decreased by the double-tuned circuit, and the picture carrier amplitude will increase, thereby offsetting the signal amplitude imbalance shown in FIG. 1a.

In a similar manner, when the I.F. signal amplitude relationship is distorted as shown in FIG. 1b, the amplitude of the chrominance reference bar of the VIR signal will be compressed, and the lower frequency luminance components will exhibit substantially their normal amplitude relationships. This will cause the ratio of the detected VIR signal components at terminals A and B to be less than normal. The lower ratio indication signal at the output of differential amplifier 100 will be applied to the control voltage generator 106, which will produce a lower control voltage. This voltage will tune the double-tuned circuit 40 to lower resonant frequencies, and the double-tuned circuit will exhibit a response curve as shown by dashed curve 12 in FIG. 4. The double-tuned circuit will attenuate the picture carrier and lower baseband frequency luminance signal components to a greater degree than the chroma signal carrier and its surrounding frequency components, which will offset the unequal signal responses of FIG. 1b.

Frequencies above the picture carrier frequency and below the chroma carrier frequency are rolled off at a very gradual rate by the double-tuned circuit 40. Hence, the double-tuned circuit introduces no distortion at the upper and lower extremes of the desired channel frequency band. Signals at these extremes are rolled off much more sharply by the response characteristics of the SAW filter 64.

It has been found that only a moderate amount of passband shaping is required by the double-tuned circuit to achieve the desired correction. In particular, a range of adjustment of 4-5 dB has been found to be satisfactory for the chroma and picture carrier signals. It has also been found that the chroma and picture carriers should be attenuated by 4.5 and 5 dB, respectively, relative to the amplitude at the center of the band, at the output of the SAW filter 64. Thus, the cumulative attenuation of these carriers by both the double-tuned circuit 40 and the SAW filter 64 must be considered in the design of the I.F. section of the receiver of FIG. 2a. It has been found that the gain and response characteristic of the preamplifier 62 may be advantageously chosen to provide any necessary equalization in the I.F. section. The double-tuned circuit 40 of FIG. 1a has also been found to exhibit a favorable group delay characteristic, which will offset the unfavorable group delay characteristic of the tuner during periods of signal amplitude distortion.

The arrangement of FIG. 2c may be used in place of the arrangement of FIG. 2b to develop the control voltage. In this arrangement, the detected signal components at terminals A and B are converted to digital signals by analog-to-digital converters 110 and 112. The digital signals are applied to a microprocessor for computation and production of a digital control signal. This digital signal is converted back to an analog signal by a digital-to-analog converter and buffer 116, from which the control voltage is applied to terminal C. The microprocessor also receives a timing signal from the line counter 74 by way of a conductor 111.

Like the arrangements of FIG. 2b, the microprocessor can determine whether a VIR signal is present by examining the digitized signals from terminals A and B during the line 19 interval. The microprocessor can also provide noise immunity by comparing the signals at terminals A and B with previously received VIR signal components. Changes in signal levels, beyond a certain range of deviation would indicate the presence of noise in the system. Such erroneous signal levels would then be disregarded by the microprocessor in the updating of the control signal.

If desired, the microprocessor can be programmed to develop separate control voltages for the varactor diodes 42 and 54, in which case the connection between resistors 56 and 58 in FIG. 2a would be broken and tuning control signals applied to the separated resistors. A third control signal can also be developed and applied to a third varactor diode coupled to the otherwise grounded end of inductor 45 to tune the circuit 40 additionally by varying signal coupling from its input to its output. The use of three tuning control signals provides an endless variety of possible response characteristics, which may be appropriately selected by the microprocessor.

What is claimed is:

1. In a television receiver, including a source of intermediate frequency television signals containing a picture carrier and a chrominance subcarrier; means, responsive to said intermediate frequency signals, for processing said intermediate frequency signals; and a video detector responsive to said processed intermediate frequency signals for producing baseband video signals including a VIR signal having a chrominance reference bar and a luminance reference level; apparatus for controlling the intermediate frequency passband response of said television receiver in response to said VIR signal, including:

means, operable during a first portion of said VIR signal, for detecting the amplitude of said chrominance reference bar of said VIR signal;

means, operable during a second portion of said VIR signal, for detecting the amplitude of said luminance reference level of said VIR signal;

means, responsive to said detected amplitudes of said chrominance reference bar and said luminance reference level, for producing a control signal indicative of the ratio of said detected signal amplitudes; and a passband shaping circuit, included within said intermediate frequency signal processing means, and responsive to said control signal for controlling the amplitude versus frequency response characteristic of said intermediate frequency signal processing means as a function of said ratio of said detected signals.

2. The arrangement of claim 1, further comprising:

means, responsive to said baseband video signals, for producing an output signal substantially at the time of occurrence of said VIR signal;

a gate pulse generator coupled to receive said output signal of said VIR timing signal producing means and responsive to said output signal for generating a first gating signal during the occurrence of said chrominance reference bar and a second gating signal during the occurrence of said luminance reference level;

a first gate having a signal input coupled to the output of said video detector, a signal output coupled to said chrominance reference bar detecting means, and a control input responsive to said first gating signal for applying said chrominance reference bar to said chrominance reference bar detecting means; and a second gate having a signal input coupled to the output of said video detector, a signal output coupled to said luminance reference level detecting means, and a control input responsive to said second gating signal for applying said luminance reference level to said luminance reference level detecting means.

3. The arrangement of claim 2, wherein said control signal producing means includes a differential amplifier having a first input coupled to receive said detected amplitude of said chrominance reference bar, a second input coupled to receive said detected amplitude of said luminance reference level, and an output at which said ratio indicative control signal is produced.

4. The arrangement of claim 3, wherein said passband shaping circuit comprises a double-tuned circuit including a tuned input section and a tuned output section, each of said sections including a varactor diode tuning element coupled to receive said control signal.

5. The arrangement of claim 4, wherein said control signal producing means further includes a control voltage generator having an input coupled to the output of said differential amplifier and an output coupled to said varactor diode tuning elements for applying a nominal tuning control voltage to said varactor diode tuning elements when said baseband video signal does not contain a VIR signal, and for applying a tuning control voltage to said varactor diode tuning elements as a function of said ratio indicative control signal when said baseband video signal contains a VIR signal;

wherein variations of said tuning control voltage vary the tuning of said tuned input and output sections of said double-tuned circuit in the same sense.

6. The arrangement of claim 2, wherein said control signal producing means comprises:

means for converting said detected amplitude of said chrominance reference bar to a first digital signal;
means for converting said detected amplitude of said luminance reference level to a second digital signal; and digital processing means responsive to said first and second digital signals for producing said ratio indicative control signal.

7. In a television receiver, including a source of intermediate frequency television signals containing a picture carrier and a chrominance subcarrier; means, responsive to said intermediate frequency signals, for processing said intermediate frequency signals; and a video detector responsive to said processed intermediate frequency signals for producing baseband video signals including a VIR signal having a chrominance reference bar and a luminance reference level; apparatus for controlling the intermediate frequency passband response of said television receiver in response to said VIR signal, comprising:

means, operable during a first portion of said VIR signal, for detecting the amplitude of said chrominance reference bar of said VIR signal;

means, operable during a second portion of said VIR signal, for detecting the amplitude of said luminance reference level of said VIR signal;

means, responsive to said detected amplitudes of said chrominance reference bar and said luminance reference level, for producing a control signal indicative of the ratio of said detected signal amplitudes; and a passband shaping circuit, included within said intermediate frequency signal processing means, and exhibiting an amplitude versus frequency response characteristic occupying a band of frequencies including the frequencies of said picture carrier and said chrominance subcarrier, said response characteristic being variable in response to variations of said control signal so as to affect the attenuation produced at said picture carrier and said chrominance subcarrier frequencies in a complementary manner.

8. In a television receiver, including a source of intermediate frequency television signals containing a picture carrier and a chrominance subcarrier, means, responsive to said intermediate frequency signals, for processing said intermediate frequency signals; and a video detector responsive to said processed intermediate frequency signals for producing baseband video signals including a VIR signal havng a chrominance reference bar and a luminance reference level; apparatus for controlling the intermediate frequency passband response of said television receiver in response to said VIR signal, including:

means, operable during a first portion of said VIR signal, for detecting the amplitude of said chrominance reference bar of said VIR signal;

means, operable during a second portion of said VIR signal, for detecting the amplitude of said luminance reference level of said VIR signal;

means, responsive to said detected amplitudes of said chrominance reference bar and said luminance reference level, for producing a control signal indicative of the ratio of said detected signal amplitudes; and a passband shaping circuit, included within said intermediate frequency signal processing means, and exhibiting an amplitude versus frequency response characteristic defining a passband and occupying a band of frequencies including the frequencies of said picture carrier and said chrominance subcarrier, said passband shaping circuit being responsive to changes of said control signal for selectively moving said passband in one of an upward or downward direction in frequency.

* * * * *

UNITED STATES PATENT AND TRADEMARK OFFICE
CERTIFICATE OF CORRECTION

PATENT NO. : 4,366,498

DATED : December 28, 1982

INVENTOR(S) : Gerald E. Theriault

It is certified that error appears in the above-identified patent and that said Letters Patent is hereby corrected as shown below:

Column 1, line 11, "receiver" (second occurrence) should be -- receive --;

Column 5, line 44, "12" should be -- 124 --.

Signed and Sealed this

First Day of March 1983

[SEAL]

Attest:

GERALD J. MOSSINGHOFF

Attesting Officer

Commissioner of Patents and Trademarks